(12) United States Patent
Nagaoka et al.

(10) Patent No.: US 8,308,378 B2
(45) Date of Patent: Nov. 13, 2012

(54) BARRIER APPARATUS AND IMAGE PICKUP APPARATUS

(75) Inventors: Koji Nagaoka, Hino (JP); Takeshi Hiroshima, Kokubunji (JP)

(73) Assignee: Olympus Imaging Corp., Tokyo (JP)

( * ) Notice: Subject to any disclaimer, the term of this patent is extended or adjusted under 35 U.S.C. 154(b) by 148 days.

(21) Appl. No.: 12/800,335

(22) Filed: May 12, 2010

(65) Prior Publication Data

US 2010/0296803 A1 Nov. 25, 2010

(30) Foreign Application Priority Data

May 20, 2009 (JP) ................................. 2009-122478

(51) Int. Cl.
*G03B 17/00* (2006.01)
*G02B 23/16* (2006.01)
(52) U.S. Cl. ....................................... 396/448; 359/511
(58) Field of Classification Search .................. 396/448; 359/511

See application file for complete search history.

(56) References Cited

U.S. PATENT DOCUMENTS

| 5,081,481 A * | 1/1992 | Katsumura | 396/467 |
| 6,264,380 B1 * | 7/2001 | Omiya | 396/448 |
| 6,674,896 B1 * | 1/2004 | Torre-Bueno | 382/162 |
| 2007/0002546 A1 * | 1/2007 | Nomura et al. | 361/748 |

FOREIGN PATENT DOCUMENTS

JP 08-220595 8/1996

* cited by examiner

*Primary Examiner* — Clayton E Laballe
*Assistant Examiner* — Noam Reisner
(74) *Attorney, Agent, or Firm* — Kenyon & Kenyon LLP

(57) ABSTRACT

A barrier apparatus of the present invention includes: a support section having an opening portion; a pair of support shaft sections provided around the opening portion; a pair of shielding members having a proximal end portion supported rotatably by the support shaft section, and a distal end movable into and out of the opening portion by the rotation; a pair of engaging sections provided on the pair of shielding members, respectively, each extending from the proximal end portion of the shielding member to a side closer to the center of the opening portion than the support shaft section, and spaced a predetermined distance apart from the distal end of the other shielding member in an optical axis direction of the optical path; and a driving section that engages the pair of engaging sections, and rotates the pair of shielding members by the rotation.

5 Claims, 11 Drawing Sheets

BARRIER APPARATUS AND IMAGE PICKUP APPARATUS

CROSS REFERENCE TO RELATED APPLICATION

This application claims the benefit of Japanese Application No. 2009-122478 filed in Japan on May 20, 2009, the contents of which are incorporated herein by this reference.

BACKGROUND OF THE INVENTION

1. Field of the Invention

The present invention relates to a barrier apparatus for opening/closing an opening portion provided in a front surface of a photographing optical system, and an image pickup apparatus including the barrier apparatus.

2. Description of the Related Art

To protect a front surface of a photographing optical system such as a lens barrel of an image pickup apparatus from damage or dirt, a barrier apparatus for opening/closing an opening portion provided in the front surface of the photographing optical system has been known. For example, as disclosed in Japanese Patent Application Laid-Open Publication No. 8-220595, a barrier apparatus has a function of opening/closing an opening portion provided in a front surface of a photographing optical system with a plurality of blade-shaped shielding members movable into and out of the opening portion.

As a barrier apparatus for opening/closing an opening portion with a blade-shaped shielding member, a configuration is known in which a shielding member is rotated around a support shaft provided around an opening portion and thus moved into and out of the opening portion. In the barrier apparatus having such a configuration, a power point for inputting a driving force is provided at a position radially apart from the support shaft in the shielding member to apply moment around the support shaft to the shielding member. For example, a configuration is perceived in which a power point for inputting a driving force to a shielding member is provided on a side closer to a center of the opening portion than the support shaft.

Also, the barrier apparatus is desired to be reduced in diameter for reducing a diameter of a lens barrel. Thus, as disclosed in Japanese Patent Application Laid-Open Publication No. 8-220595, the barrier apparatus has a configuration in which a plurality of shielding members open/close the opening portion to reduce a width of the shielding member so that an inner diameter of the opening portion is larger than an outer diameter of the apparatus.

SUMMARY OF THE INVENTION

A barrier apparatus of the present invention includes: a support section having an opening portion through which an optical path of a photographing optical system passes; a pair of support shaft sections provided around the opening portion in the support section and in opposed positions with a center of the opening portion between the support shaft sections; a pair of shielding members having a proximal end portion supported rotatably around an axis along an optical axis of the optical path by the support shaft section, and a distal end movable into and out of the opening portion by the rotation; a pair of engaging sections provided on the pair of shielding members, respectively, each extending from the proximal end portion of the shielding member to a side closer to the center of the opening portion than the support shaft section, and spaced a predetermined distance apart from the distal end of the other shielding member in an optical axis direction of the optical path; and a driving section that engages the pair of engaging sections, is rotatable around the axis along the optical axis passing through the center of the opening portion with respect to the support section, and rotates the pair of shielding members by the rotation.

An image pickup apparatus of the present invention includes the barrier apparatus, and the photographing optical system is an image pickup apparatus including a focus lens group and a zoom lens group, including: a fixed frame; a focus lens holding frame holding the focus lens group; a zoom lens holding frame holding the zoom lens group; a focus driving unit provided on an outer peripheral portion of the fixed frame, and including a focus motor for focus driving of the focus lens group and a rotation transmitting mechanism of the focus motor; a zoom driving unit provided on the outer peripheral portion of the fixed frame and including a zoom motor for zoom driving of the zoom lens group and a rotation transmitting mechanism of the zoom motor; and an image pickup device that receives an optical image formed via the image pickup optical system.

DETAILED DESCRIPTION OF THE PREFERRED EMBODIMENTS

Figure 1:
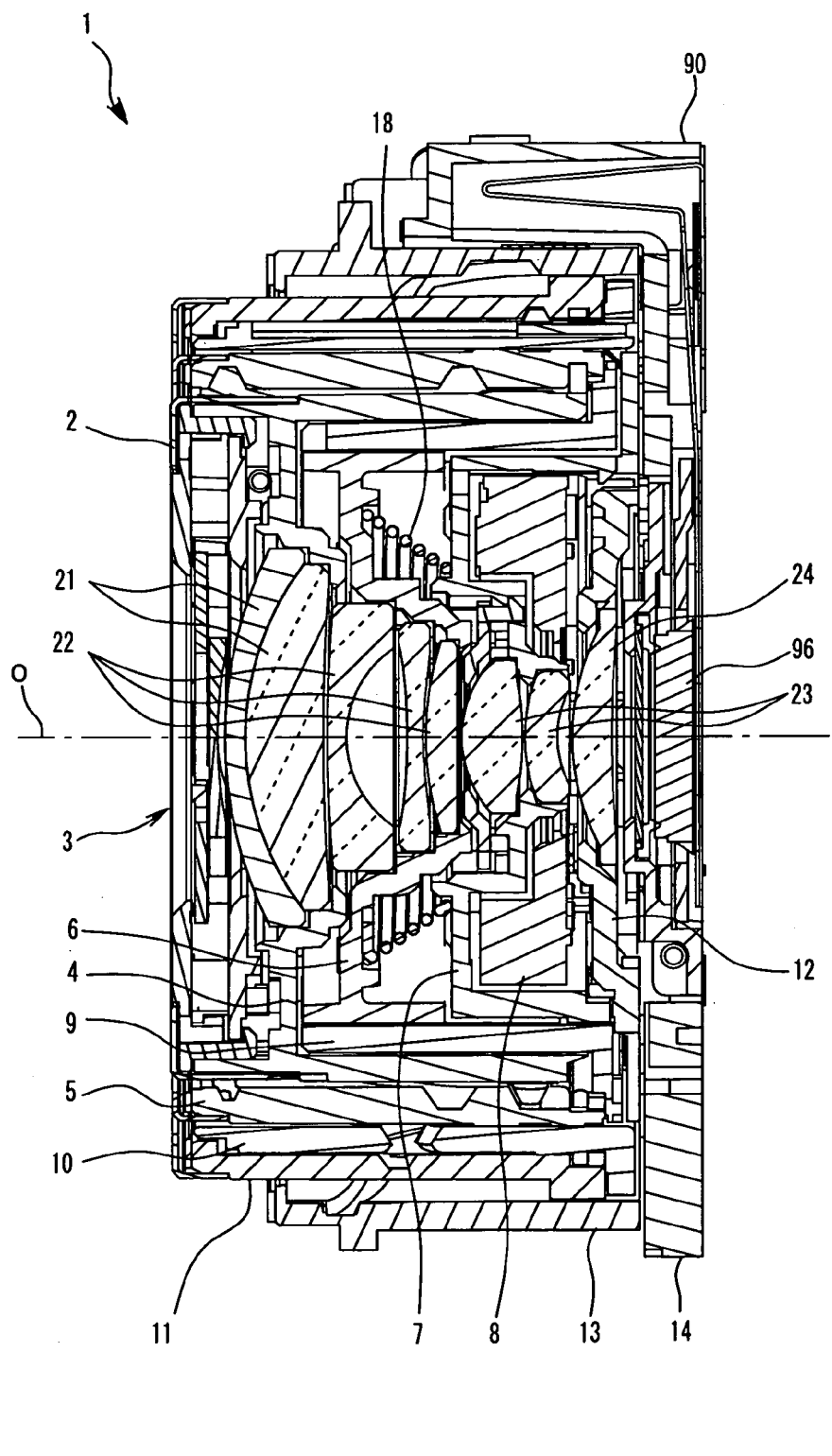
FIG. 1 is a vertical sectional view including a lens optical axis in a retracted state of a lens barrel.

Now, a preferred embodiment of the present invention will be described with reference to the drawings. In the drawings used for the description below, components have different scales so as to have recognizable sizes in the drawings, and the present invention is not limited to the numbers of the components, shapes of the components, size ratios of the components, and relative positional relationships between the components shown in the drawings.

Figure 2:
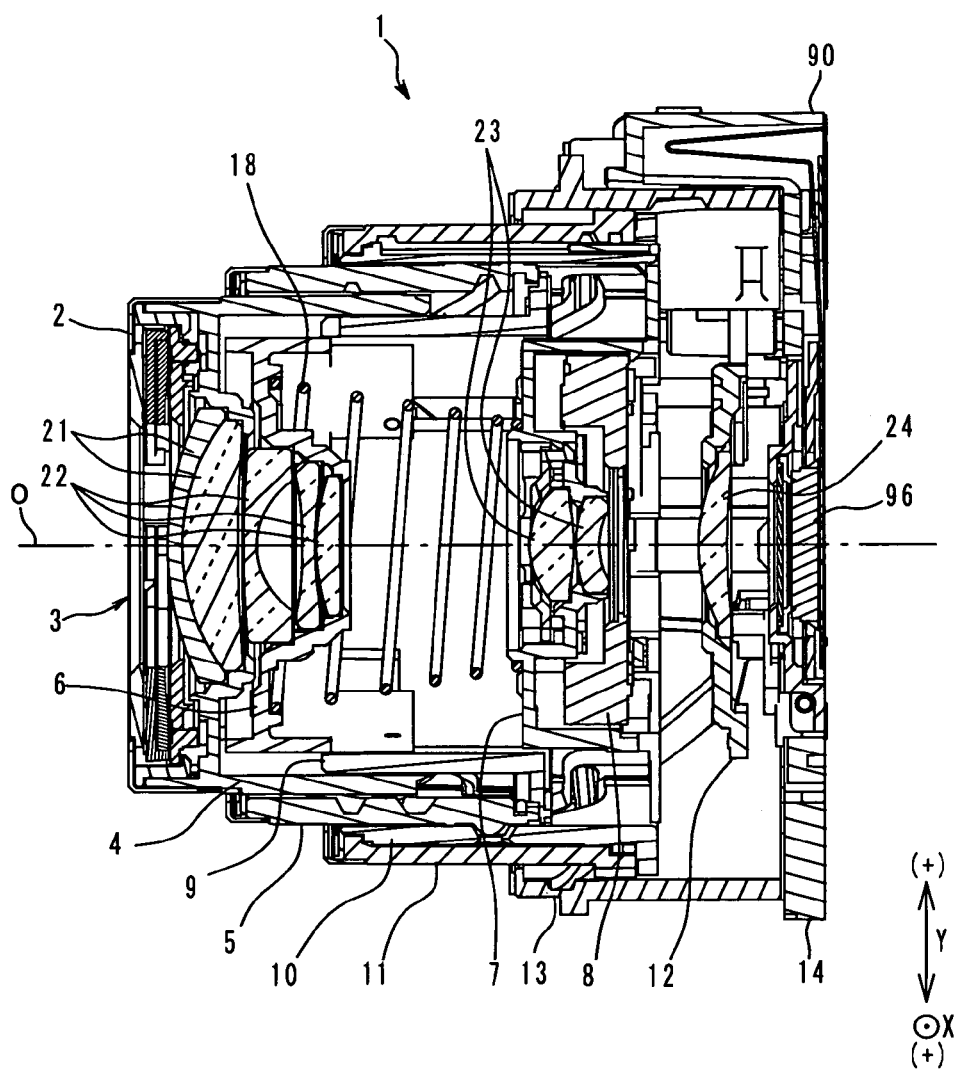
FIG. 2 is a vertical sectional view including the lens optical axis in a photographable wide-angle state of the lens barrel.
Figure 3:
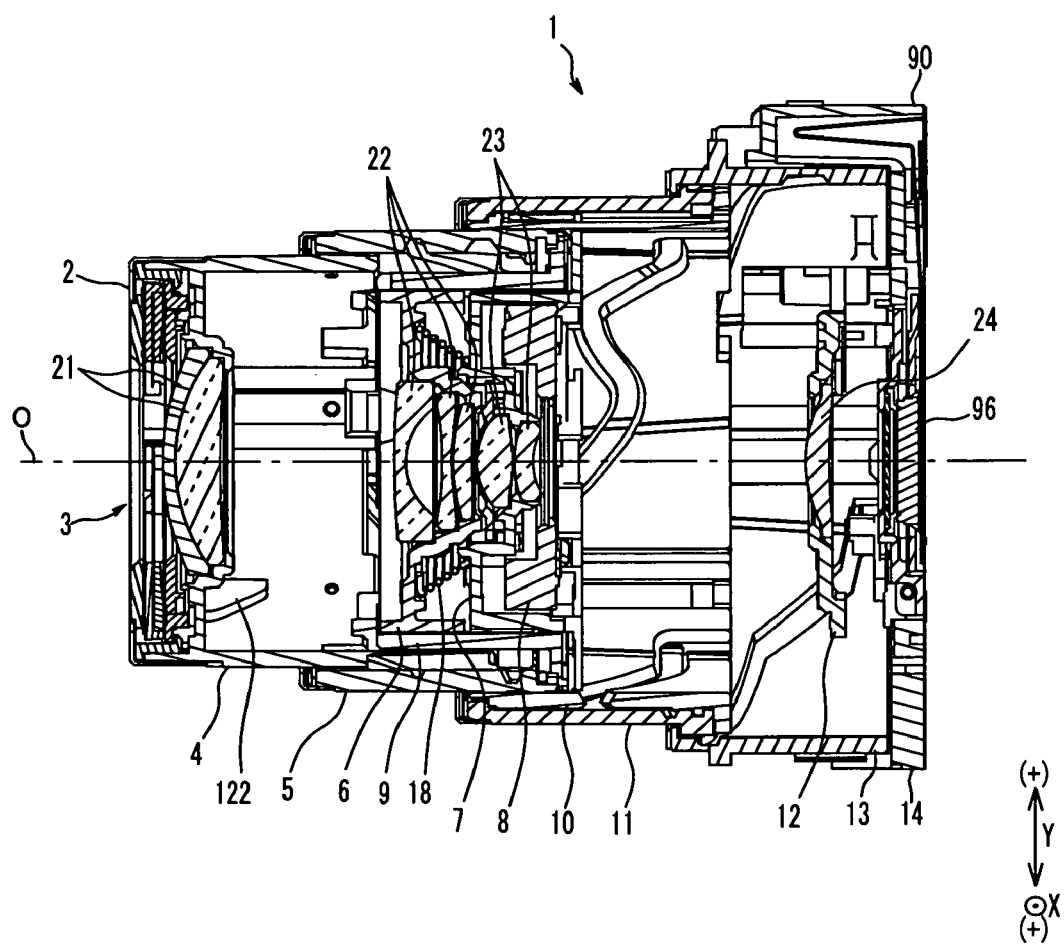
FIG. 3 is a vertical sectional view including the lens optical axis in a photographable telephoto state of the lens barrel.

As shown in FIGS. 1 to 3, a lens barrel 1 of the present embodiment is a retractable lens barrel holding a photographing optical system of a four group configuration including a first group lens 21 having positive refractive power, a second group lens 22 having negative refractive power, a third group lens 23 having positive refractive power, and a fourth group lens 24 having positive refractive power, with a frame member holding the photographing optical system being retracted in a non-photographing state. The lens barrel 1 includes a shutter/diaphragm unit 8.

In the present embodiment, the lens barrel 1 is integrally formed with an image pickup unit 90 holding an image pickup device 96 on an image forming surface of the photographing optical system by way of example, and can be included in electronic equipment such as a digital camera having an image pickup function as an image pickup apparatus. The image pickup unit 90 has an image shake correction function of movably supporting the image pickup device 96 on a plane perpendicular to an optical axis of the photographing optical system.

In the description below, a photographing lens optical axis of the photographing optical system is denoted by "O". In a direction along the optical axis O (hereinafter referred to as optical axis O direction), a subject side direction is a front direction and an image forming side direction is a rear direction. Also, a direction perpendicular to the optical axis O, which is a lateral direction viewed from a front side, is an X direction, and particularly a right direction is a +X side. A vertical direction perpendicular to the optical axis O is a Y direction, and particularly an upper direction is a +Y side. A plane perpendicular to the optical axis O is an XY plane.

The lens barrel 1 includes a first group frame 4, a second group frame 6, a third group frame 7, and a fourth group frame 12 that are movable frame members holding the first group lens 21, the second group lens 22, the third group lens 23, and the fourth group lens 24, respectively, which will be described later in detail. The first group frame 4, the second group frame 6, the third group frame 7, and the fourth group frame 12 are relatively movable with respect to a fixed frame 13 in the optical axis O direction.

The lens barrel 1 of the present embodiment includes the fourth group lens 24 configured as a focus lens group, and the fourth group frame 12 as the focus lens holding frame holding the fourth group lens 24 is moved to focus. The lens barrel 1 of the present embodiment includes the first group lens 21, the second group lens 22, and the third group lens 23 configured as zoom lens groups, and the first group frame 4, the second group frame 6, and the third group frame 7 as the zoom lens holding frames holding these lenses are moved to change a focal length (to zoom).

When the lens barrel 1 is in a retracted state, as shown in FIG. 1, the frame members are retracted to the fixed frame 13 described later, the first group lens 21, the second group lens 22, the third group lens 23, and the fourth group lens 24 are brought close to each other, and an entire length in the optical axis O direction is reduced. On the other hand, when the lens barrel 1 is in a photographable zoom wide-angle state and a photographable zoom telephoto state, as shown in FIGS. 2 and 3, the frame members are advanced forward in the optical axis O direction from the fixed frame 13.

Figure 4:
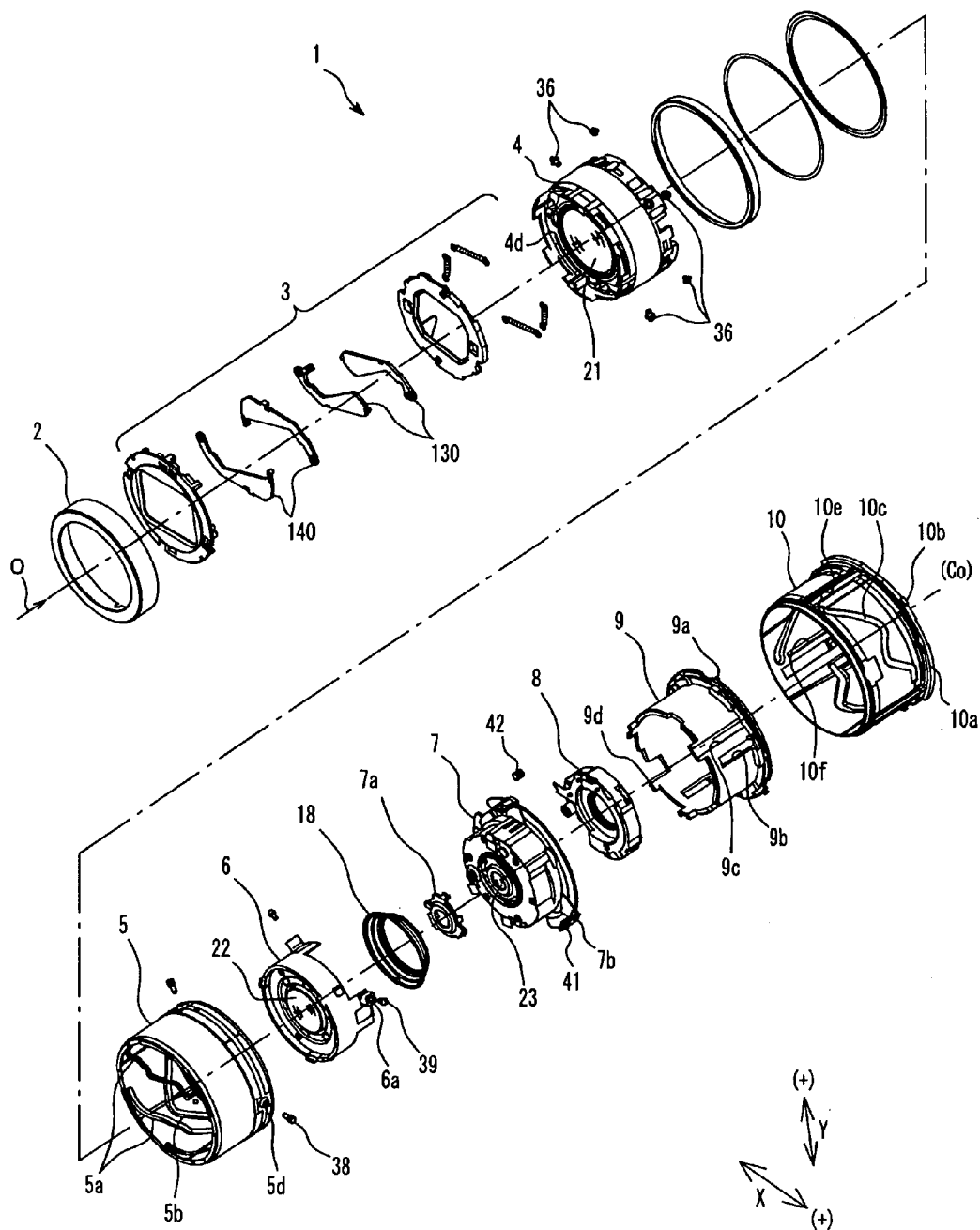
FIG. 4 is an exploded perspective view showing a part of the lens barrel.
Figure 5:
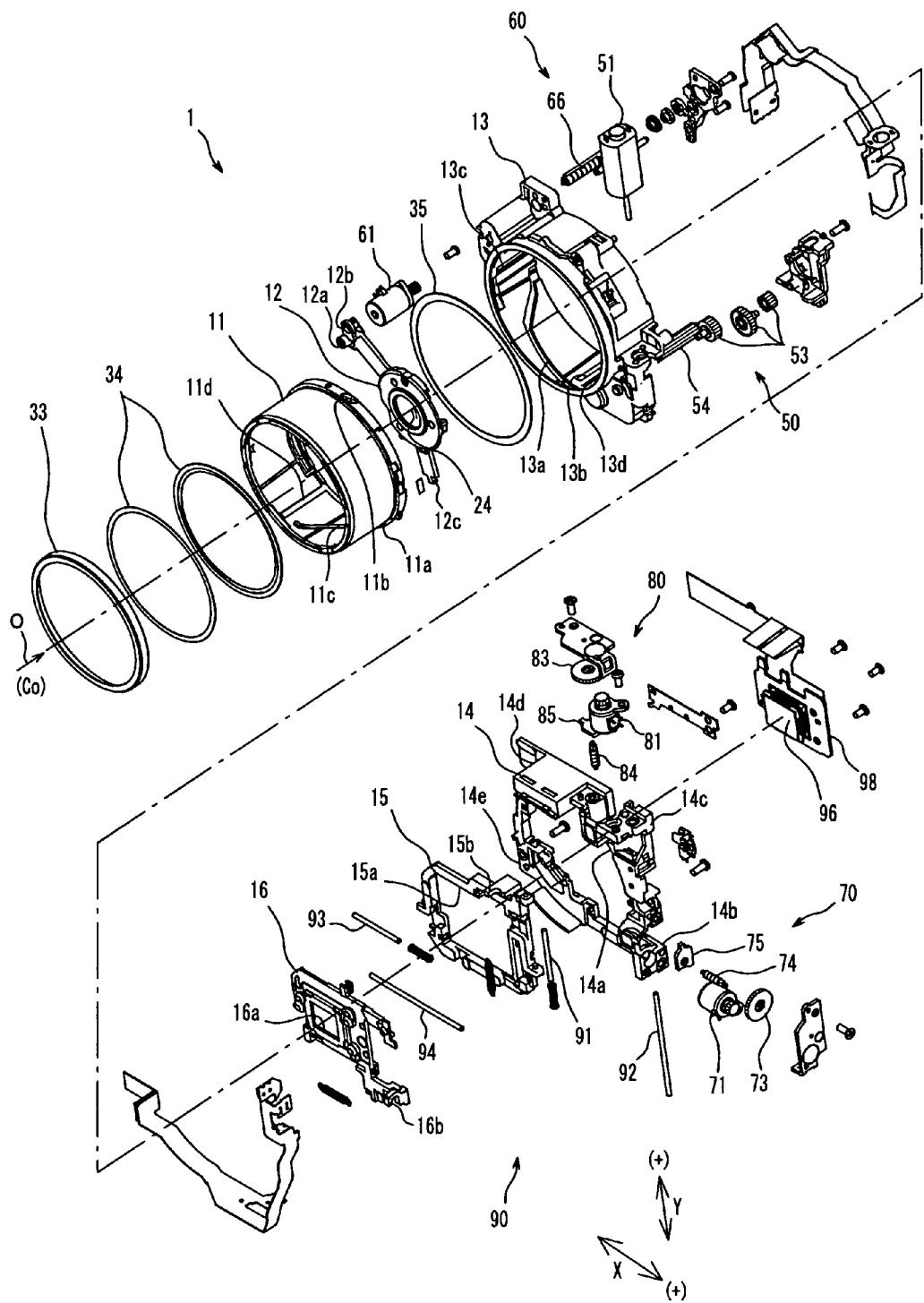
FIG. 5 is an exploded perspective view showing a different part of the lens barrel in FIG. 4.

Now, the configuration of the lens barrel 1 will be described. As shown in FIGS. 4 and 5, the lens barrel 1 mainly includes a barrier apparatus 3, the first group frame 4, the second group frame 6, a cam frame 5, the third group frame 7, the shutter/diaphragm unit 8, a float key 9, a movable frame 10, a rotating frame 11, the fourth group frame 12, the fixed frame 13, a zoom driving unit 50, a focus driving unit 60, and the image pickup unit 90.

The barrier apparatus 3 is placed on a front side of the photographing optical system and opens/closes an opening portion provided on an optical path of the photographing optical system with a movable shielding member to protect the photographing optical system. The cam frame 5 is rotated around the optical axis O to drive the first group frame 4 and the second group frame 6 forward and backward in the optical axis O direction. The float key 9 restricts rotation of the first group frame 4 and the second group frame 6 around the optical axis O. The movable frame 10 drives the cam frame 5 forward and backward in the optical axis O direction, and restricts rotation of the third group frame 7 and the float key 9 around the optical axis O. The rotating frame 11 is rotated around the optical axis O to rotationally drive the cam frame 5 and move the third group frame 7 forward and backward in the optical axis O direction.

The fixed frame 13 is a member fixed in position with respect to the optical axis O, supports the rotating frame 11 rotatably around the optical axis O and movably forward and backward, and further restricts rotation of the movable frame 10 around the optical axis O. The zoom driving unit 50 rotationally drives the rotating frame 11 around the optical axis O, and performs advancing and retracting operations of the lens barrel 1, and zoom driving for driving the zoom lens holding frame forward and backward in the optical axis O direction. The focus driving unit 60 performs focus driving for driving the fourth group frame 12 as the focus lens holding frame forward and backward in the optical axis O direction.

The image pickup unit 90 holds the image pickup device 96, and drives the image pickup device 96 displaceably on a plane perpendicular to the optical axis O. The image pickup unit 90 of the present embodiment is configured to drive the image pickup device 96 displaceably in an X direction as a first direction and a Y direction as a second direction in a plane parallel to a light receiving surface of the image pickup device 96.

Now, detailed configurations of the components that constitute the lens barrel 1 will be described.

The fixed frame 13 is a frame member having a cylindrical portion, houses the members in an inner peripheral portion, and has a back surface to which a base portion 14 of the image pickup unit 90 is secured. The fixed frame 13 has a rotating frame cam groove 13a diagonal to the optical axis O direction, a movable frame straight guide groove 13c and a fourth group frame straight guide groove 13b in the optical axis O direction, and a gear housing recess 13d that houses a long gear 54 described later in an inner peripheral portion of the cylindrical portion of the fixed frame 13.

The zoom driving unit 50 is provided on a right side of an outer peripheral portion of the cylindrical portion of the fixed frame 13, and the focus driving unit 60 is provided in an upper left position of the outer peripheral portion of the cylindrical portion. A light shielding ring 35 is secured to a front surface of the fixed frame 13.

The rotating frame 11 is a substantially cylindrical frame member, and a rear end outer periphery thereof fits in the inner peripheral portion of the fixed frame 13 so as to be rotationally movable forward and backward. A cam follower 11b is provided on the rear end outer periphery of the rotating frame 11. The cam follower 11b slidably fits in the cam groove 13a in the fixed frame 13.

A gear portion 11a that meshes with the long gear 54 is provided in a predetermined range of the rear end outer periphery of the rotating frame 11. A third group frame cam groove 11c diagonal to the optical axis O direction, and a cam frame straight groove 11d are provided in an inner peripheral portion of the rotating frame 11.

The rotating frame 11 is rotationally driven around the optical axis O by rotation of the long gear 54 driven by the zoom driving unit 50. The rotating frame 11 is moved forward and backward in the optical axis O direction while being rotated around the optical axis O by engagement between the cam follower 11b and the cam groove 13a in the fixed frame 13. To a front surface outer peripheral portion of the rotating frame 11, a light shielding ring 34 and a decorative ring 33 are mounted.

The movable frame 10 is a frame member having a cylindrical portion, which fits in the inner peripheral portion of the rotating frame 11. On a rear end of the cylindrical portion of the movable frame 10, a flange 10a bayonet-connected to the rotating frame 11 is provided. On a rear end outer periphery of the movable frame 10, a guide pin 10b is provided protruding radially outward from the rotating frame 11 and engaging the straight guide groove 13c in the fixed frame 13.

The movable frame 10 is moved forward and backward together with the rotating frame 11 in the optical axis O direction, and supported by the rotating frame 11 relatively rotatably around the optical axis O. The movable frame 10 is moved forward and backward together with the rotating frame 11 in the optical axis O direction with rotation around the optical axis O being restricted by the engagement between the guide pin 10b and the straight guide groove 13c in the fixed frame 13.

In the cylindrical portion of the movable frame 10, a cam frame cam groove 10c passing through the cylindrical portion and diagonal to the optical axis O, a third group frame straight guide groove 10e passing through the cylindrical portion, and a float key straight guide groove 10f engraved in an inner peripheral portion of the cylindrical portion.

The cam frame 5 is a cylindrical frame member, and fits in the inner peripheral portion of the movable frame 10 so as to be rotationally movable forward and backward. A cam follower 5d protruding radially outward is provided on a rear outer peripheral portion of the cam frame 5. A straight guide pin 38 protruding outward is fitted in and secured to a center of the cam follower 5d.

The cam follower 5d slidably fits in the cam groove 10c in the movable frame 10, the straight guide pin 38 passes through the cam groove 10c and then slidably fits in the straight groove 11d in the rotating frame 11. Thus, the cam frame 5 is rotated together with the rotating frame 11 and supported movably forward and backward in the optical axis O direction along the cam groove 10c in the movable frame 10.

In the inner peripheral portion of the cam frame 5, a first group frame cam groove 5a and a second group frame cam groove 5c are provided.

The float key 9 is a frame member having a cylindrical portion, and has a flange bayonet-connected to the cam frame 5 at a rear end thereof. The float key 9 is moved forward and backward together with the cam frame 5 in the optical axis O direction and supported relatively rotatably around the optical axis O with respect to the cam frame 5.

The float key 9 has a guide protrusion 9a protruding radially outward from the flange. The guide protrusion 9a of the float key 9 slidably fits in the straight guide groove 10f in the movable frame 10. Thus, the float key 9 is supported movably forward and backward in the optical axis O direction together with the cam frame 5 with rotation around the optical axis O being restricted by the movable frame 10.

The float key 9 also has a first group frame straight guide groove 9c engraved in an outer peripheral portion of the cylindrical portion, and a second group frame straight guide groove 9b passing through the cylindrical portion.

The first group frame 4 is a cylindrical frame member, and fits in the inner peripheral portion of the cam frame 5 movably forward and backward in the optical axis O direction with rotation around the optical axis O being restricted. The first group frame 4 holds the first group lens 21, and a cam follower 36 is secured to an outer peripheral portion thereof. A guide protrusion (not shown) that slidably fits in the straight guide groove 9c in the float key 9 is provided on an inner peripheral portion of the first group frame 4.

The cam follower 36 of the first group frame 4 slidably fit in the cam groove 5a in the cam frame 5, and the first group frame 4 is moved forward and backward in the optical axis O direction with rotation and forward and backward movement of the cam frame 5 with rotation around the optical axis O being restricted by the straight guide groove 9c in the float key 9.

The barrier apparatus 3 described later in detail is covered with a decorative ring 2 and provided on the front side of the first group frame 4. The barrier apparatus 3 includes a blade-shaped shielding member constituted by a pair of inner shielding members 130 and a pair of outer shielding members 140. In the barrier apparatus 3, the shielding members are retracted with an advancing operation of the first group frame 4 from a retraction position to open a front surface of the first group lens 21. Also, in the barrier apparatus 3, the shielding members are brought into a closed position with retraction of the first group frame 4 from a photographing position to close the front surface of the first group lens 21.

The second group frame 6 is a cylindrical frame member, and fits in the inner peripheral portion of the float key 9 movably forward and backward in the optical axis O direction with rotation around the optical axis O direction being restricted. The second group frame 6 is integrated into the rear side of the first group frame 4. The second group frame 6 holds the second group lens 22, and three guide protrusions 6a and a cam follower 39 radially protruding outward from the center of the guide protrusion 6a are provided on an outer peripheral portion of the second group frame 6.

The guide protrusion 6a slidably fits in the straight guide groove 9b in the float key 9, and the cam follower 39 slidably fits in the cam groove 5c in the cam frame 5. Thus, the second group frame 6 is moved forward and backward in the optical axis O direction by rotation and forward and backward movement of the cam frame 5 with rotation around the optical axis O being restricted.

The third group frame 7 is a cylindrical frame member and fits in the inner peripheral portion of the float key 9. The third group frame 7 is integrated into the rear side of the second group frame 6 movably forward and backward in the optical axis O direction with rotation around the optical axis O being restricted. The third group frame 7 holds the third group lens 23, and supports the shutter/diaphragm unit 8 on a back side inner peripheral portion relatively movably in the optical axis O direction.

Figure 6:
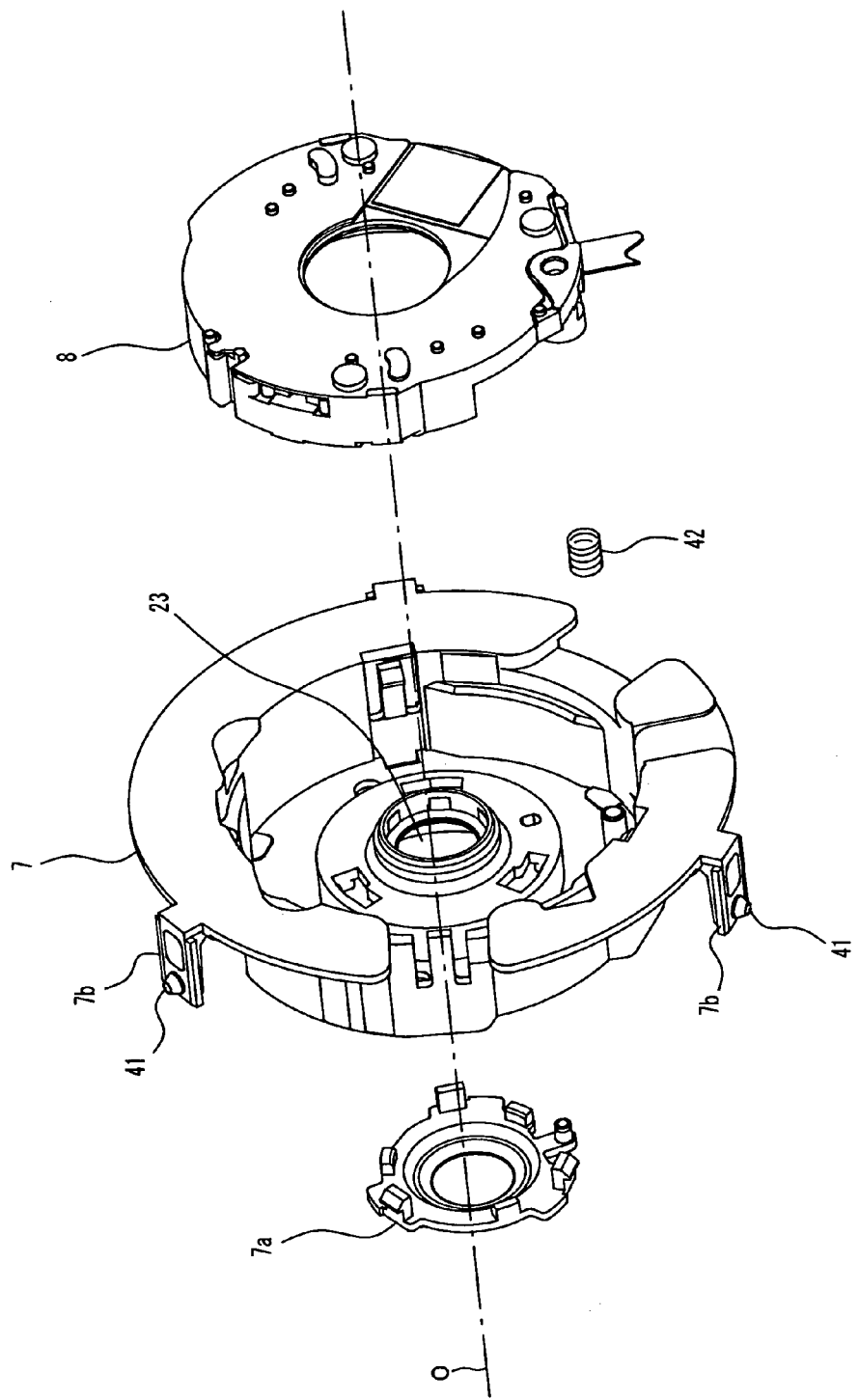
FIG. 6 is an exploded perspective view of a third group frame and a shutter/diaphragm unit in the lens barrel.

A fixed diaphragm 7a is secured to a front side of the third group frame 7. Also, as shown in FIG. 6, arm portions protruding radially outward are provided circumferentially at regular intervals on the third group frame 7. A guide protrusion 7b is provided on a distal end of each arm portion, and a cam follower 41 protruding radially outward from the guide protrusion 7b is provided on the guide protrusion 7b.

The guide protrusion 7b slidably fits in the straight guide groove 10e in the movable frame 10, and the cam follower 41 fits in the cam groove 11c in the rotating frame 11. Thus, the third group frame 7 is moved forward and backward in the optical axis O direction with rotation of the rotating frame 11 with rotation around the optical axis O being restricted.

The shutter/diaphragm unit 8 has a shutter function for opening/closing a photographing optical path and a diaphragm function for adjusting an amount of photographing light. A compression spring 42 is inserted between the shutter/diaphragm unit 8 and the third group frame 7, and the shutter/diaphragm unit 8 and the third group frame 7 are urged in directions apart from each other.

As described above, the shutter/diaphragm unit 8 is supported relatively movably with respect to the third group frame 7 in the optical axis O direction, and thus in the photographable state of the lens barrel 1 shown in FIGS. 2 and 3, the shutter/diaphragm unit 8 and the third group lens 23 are a predetermined distance apart from each other in the optical axis O direction. On the other hand, as shown in FIG. 1, in the retracted state of the lens barrel 1, the third group frame 7 is brought close to the base portion 14 to compress the compression spring 42, and the shutter/diaphragm unit 8 and the third group lens 23 are brought into substantially tight contact with each other.

In the present embodiment, an outer diameter of the rear portion of the third group lens 23 is smaller than an inner diameter when the shutter/diaphragm unit 8 is opened. Thus, in the retracted state, the shutter/diaphragm unit 8 is opened to bring the rear portion of the third group lens 23 into the shutter/diaphragm unit 8. Thus, in the present embodiment, a distance between the third group lens 23 and the fourth group lens 24 can be reduced to reduce a thickness of the lens barrel 1 in the optical axis O direction in retraction.

A conical coil spring 18 is provided between the second group frame 6 and the third group frame 7. The conical coil spring 18 urges the second group frame 6 and the third group frame 7 to be apart from each other in the optical axis O direction. An urging force of the conical coil spring 18 eliminates fitting backlashes between the cam follower 39 of the second group frame 6 and the cam groove 5c in the cam frame 5, and the cam follower 41 of the third group frame 7 and the cam groove 11c in the rotating frame 11 in the photographable state of the lens barrel 1. The fitting backlash between the cam follower 39 of the second group frame 6 and the cam groove 5c in the cam frame 5 is also eliminated in the retracted state.

The fourth group frame 12 as the focus lens holding frame holds the fourth group lens 24 as the focus lens group on the rear side of the shutter/diaphragm unit 8, and is provided movably forward and rearward in the optical axis O direction with rotation around the optical axis O being restricted. The fourth group frame 12 has two arm portions extending outward. A guide protrusion 12c is provided on one arm portion, and a guide shaft hole 12a and a feed screw insertion hole 12b are provided in the other arm portion.

A guide shaft 65 supported by the fixed frame 13 slidably fits in the guide shaft hole 12a. The guide protrusion 12c slidably fits in the straight guide groove 13b in the fixed frame 13. Thus, the fourth group frame 12 is supported movably forward and backward in the optical axis O direction along the guide shaft 65 and the straight guide groove 13b.

The focus driving unit 60 includes a focus motor 61, a feed screw 66 as a rotation transmitting mechanism rotationally driven by the focus motor 61, and an unshown nut that is threaded on the feed screw. The feed screw 66 is passed through the feed screw insertion hole 12b in the fourth group frame 12.

By the arm portion having the feed screw insertion hole 12b engaging the nut, the fourth group frame 12 is moved forward and backward in the optical axis O direction along the guide shaft 65 and the straight guide groove 13b provided in the fixed frame 13 by a driving force of the focus motor 61. With this configuration, focus driving of the fourth group lens 24 as the focus lens group is performed.

The zoom driving unit 50 includes a zoom motor 51, a gear train 53 as a rotation transmitting mechanism, and the long gear 54. The zoom motor 51 is secured to the fixed frame 13 with an output shaft in the Y direction. A worm gear is secured to the output shaft of the zoom motor 51.

The gear train 53 includes a worm wheel that meshes with the worm gear of the zoom motor 51, and a reduction gear train that meshes with the worm wheel and the long gear 54.

The long gear 54 is provided in the gear housing recess 13d in the fixed frame 13 rotatably around an axis parallel to the optical axis O. The long gear 54 meshes with the gear portion 11a of the rotating frame 11.

In the zoom driving unit 50, when the zoom motor 51 is rotationally driven in retraction driving and zoom driving of the lens barrel 1, the rotating frame 11 is rotationally driven via the long gear 54 to advance or retract the lens barrel 1.

Figure 7:
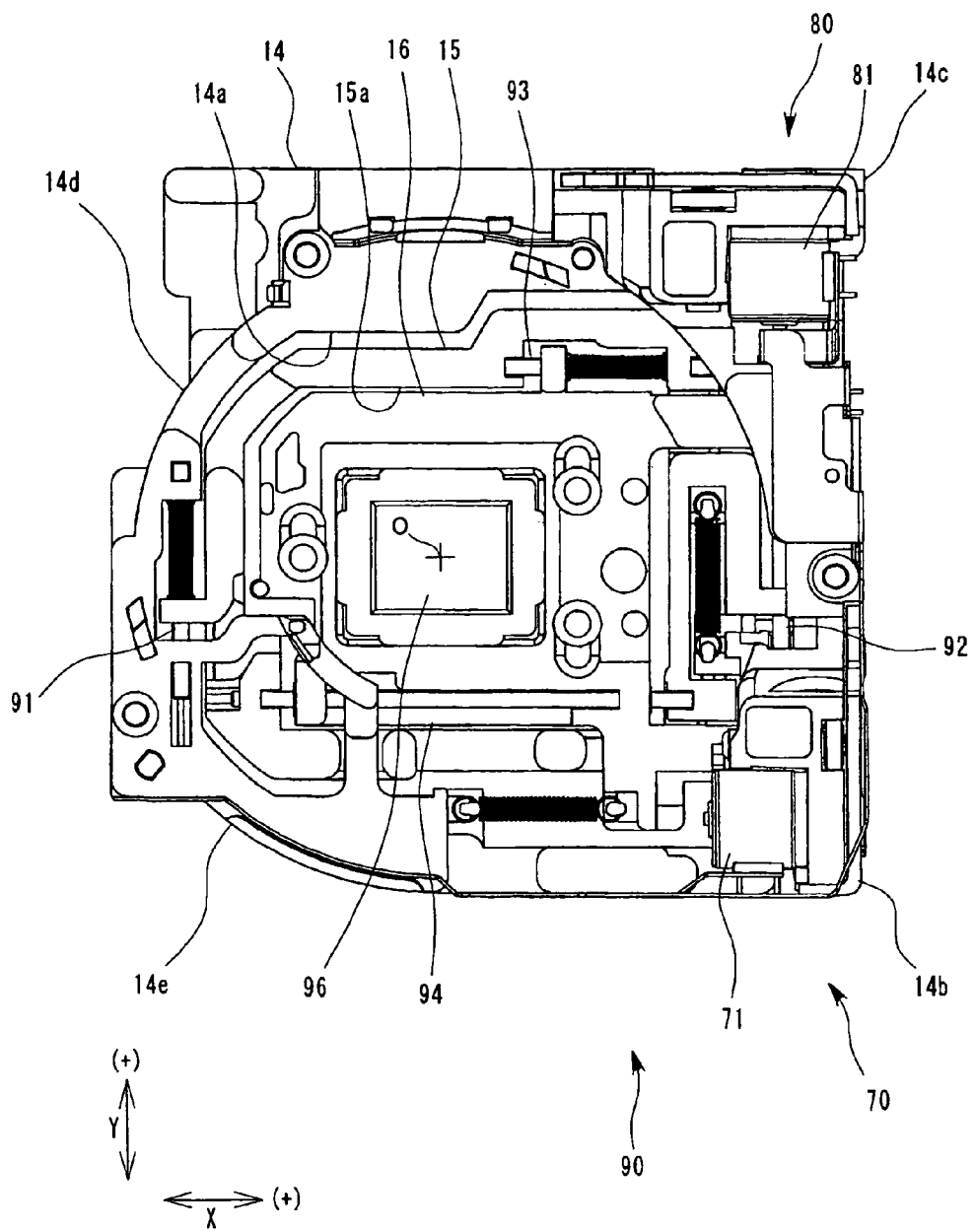
FIG. 7 is a front view of an image pickup unit.

The image pickup unit 90 is secured to a back surface of the fixed frame 13. The image pickup unit 90 includes, as shown in FIGS. 5 and 7, the base portion 14 as a base member, a Y frame 15 supported movably in the Y direction with respect to the base portion 14, an X frame 16 supported movably in the X direction with respect to the Y frame 15, an image pickup device 96 fixedly supported on the X frame 16, an X driving unit 70, and a Y driving unit 80.

The base portion 14 is a substantially rectangular frame member having a middle opening portion 14a, and an outline projection shape viewed from front having a first corner portion 14b at a lower right position around the optical axis O, a second corner portion 14c at an upper right position, a third corner portion 14d at an upper left position, and a fourth corner portion 14e at a lower left position.

The base portion 14 is secured to the back surface of the fixed frame 13. Guide shafts 91 and 92 as shaft members extending in the Y direction are secured to opposite lateral sides of the middle opening portion 14a in the base portion 14.

The third corner portion 14d has a notch, and the rear end of the focus driving unit 60 enters the notch. The fourth corner portion 14e is a member placement escape portion along the outer periphery of the fixed frame 13. The member placement escape portion is an escape portion for placing a tripod female screw portion of the digital camera to which the lens barrel 1 is mounted.

The Y frame 15 is a frame member having an opening portion 15a, and provided in the middle opening portion 14a in the base portion 14. The Y frame 15 is supported movably only in the Y direction with respect to the base portion 14 by a pair of guide shafts 91 and 92 secured to the base portion 14. Guide shafts 93 and 94 as shaft members extending in the X direction are secured to opposite vertical sides of the opening portion 15a in the Y frame 15.

The X frame 16 is a frame member having an opening portion 16a and provided in the opening portion 15a in the Y frame 15. The X frame 16 is supported movably only in the X direction with respect to the Y frame 15 by the pair of guide shafts 93 and 94 secured to the Y frame 15. The image pickup device 96 constituted by a CCD or a CMOS is secured to the X frame 95 via an image pickup device support plate 98.

The X driving unit 70 as a first driving unit is assembled to the front side of the first corner portion 14b at the upper right position of the base portion 14, and placed overlapping a rear position of the gear train 53 of the zoom driving unit 50 on the outer peripheral portion of the fixed frame 13.

The X driving unit 70 includes an X driving motor 71 as a first motor, an intermediate gear 73 that meshes with a pinion of an output shaft of the X driving motor 71, a feed screw 74 extending in the X direction to which the intermediate gear 73 is secured, and a nut 75 that is threaded on the feed screw 74.

The feed screw 74 is rotated by a driving force of the X driving motor 71. The nut 75 is threaded on the feed screw 74 with rotation being restricted, and engages a U-shaped notch 16b in the X frame 16. Thus, when the X driving motor 71 is rotationally driven, the feed screw 74 drives the nut 75 and the X frame 16 to be displaced in the X direction.

A Y driving unit 80 as a second driving section is assembled to a front side of the second corner portion 14c of the base portion 14, and provided in an upper position of the zoom motor 51 on the outer peripheral portion of the fixed frame 13. The Y driving unit 80 includes a Y driving motor 81 as a second motor, an intermediate gear 83 that meshes with a pinion of an output shaft of the Y driving motor 81, a feed screw 84 extending in the Y direction to which the intermediate gear 83 is secured, and a nut 85 that is threaded on the feed screw 84.

The feed screw 84 is rotated by a driving force of the Y driving motor 81. The nut 85 is threaded on the feed screw 84 with rotation being restricted, and engages a U-shaped notch 15b in the Y frame 15. Thus, when the Y driving motor 81 is rotationally driven, the feed screw 84 drives the nut 85 and the Y frame 15 to be displaced in the Y direction.

In the present embodiment, in the above-described lens barrel 1, an exterior color of the zoom motor 51, the focus motor 61, the Y driving motor 81, and the X driving motor 71 is black, or for example, silver other than black, and an exterior color of the fixed frame 13 and the base portion 14 is a color other than black, for example, silver, or black. The components and the motors thus have different exterior colors, and thus an assembling state in an assembling process is checked, for example, the zoom motor 51, the focus motor 61, the Y driving motor 81, and the X driving motor 71 being mounted to the above-described predetermined positions on the fixed frame 13 and the base portion 14 is checked, and the base portion 14 can be secured to the fixed frame 13.

Figure 8:
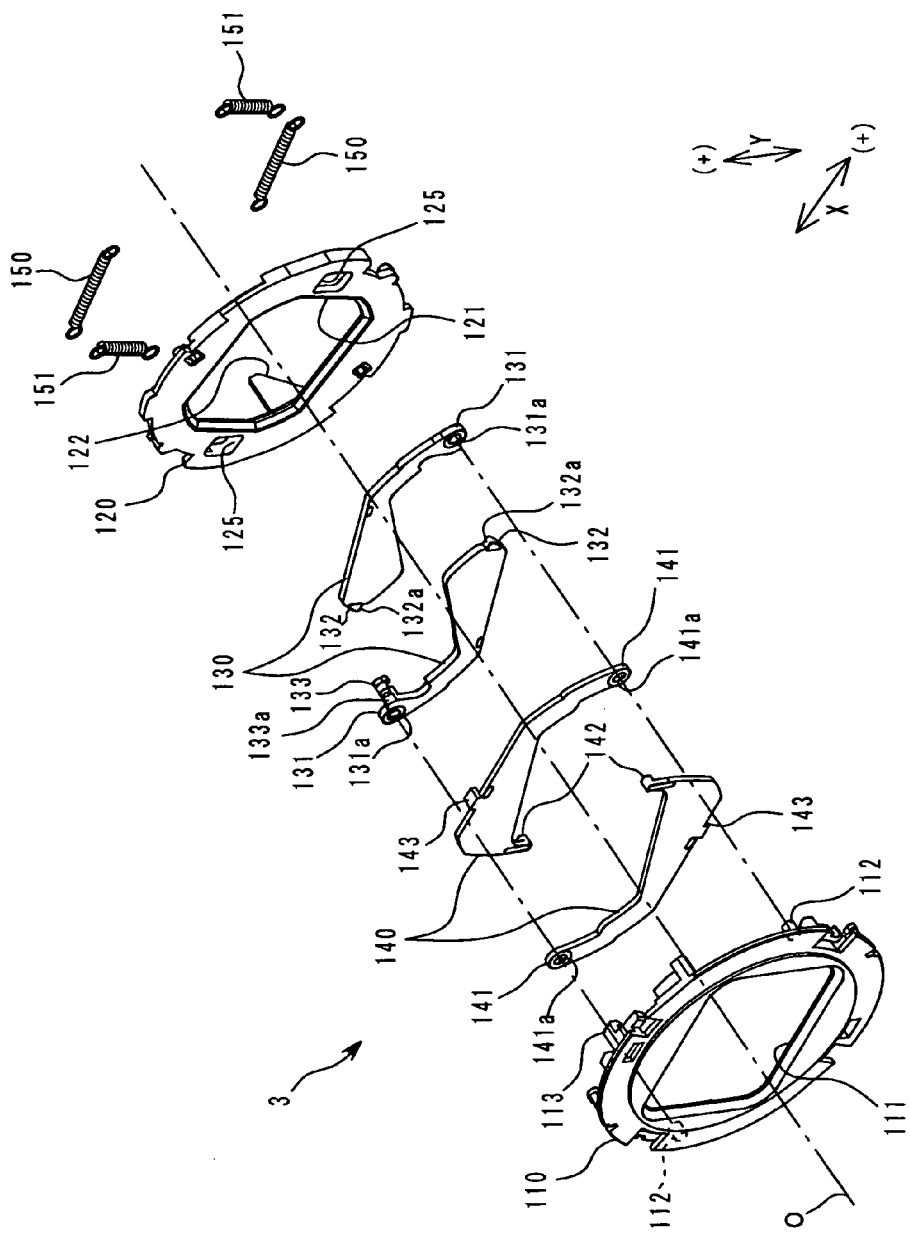
FIG. 8 is an exploded perspective view of a barrier apparatus.

Next, a detailed configuration of the barrier apparatus 3 of the present embodiment will be described. As shown in FIG. 8, the barrier apparatus 3 includes a pair of inner shielding members 130, a pair of outer shielding members 140, a support section 110, a driving section 120, and urging members 150 and 151.

The support section 110 is a substantially disk-shaped member, and has an opening portion 111 substantially around the optical axis O at the center. The support section 110 is positioned on and secured to the front surface of the first group frame 4. A pair of support shaft sections 112 protruding rearward along the optical axis O is provided on a back side of the support section 110.

Figure 9:
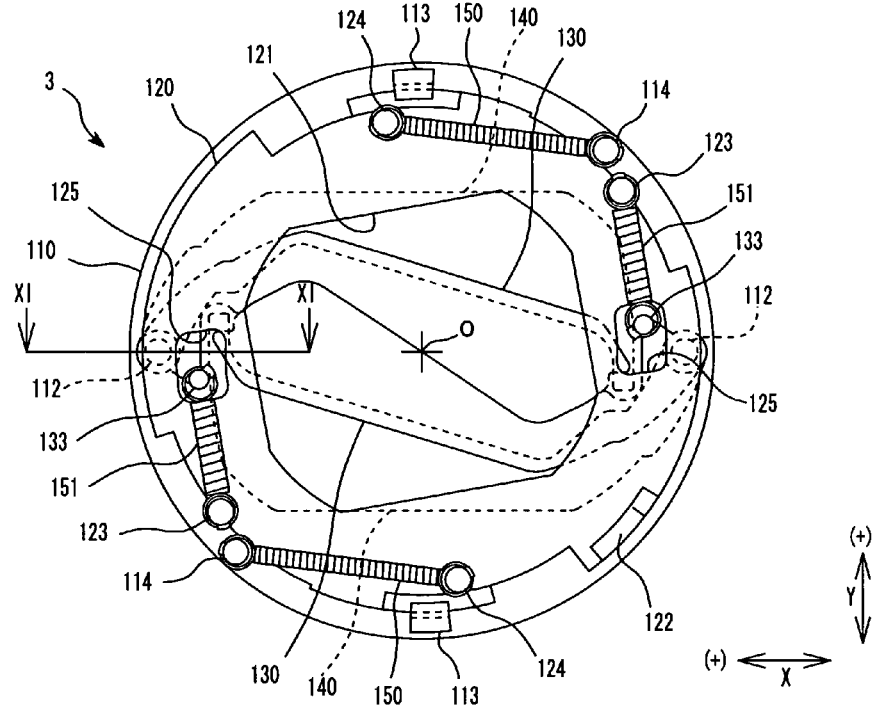
FIG. 9 is a back view of the barrier apparatus in a closed state.
Figure 10:
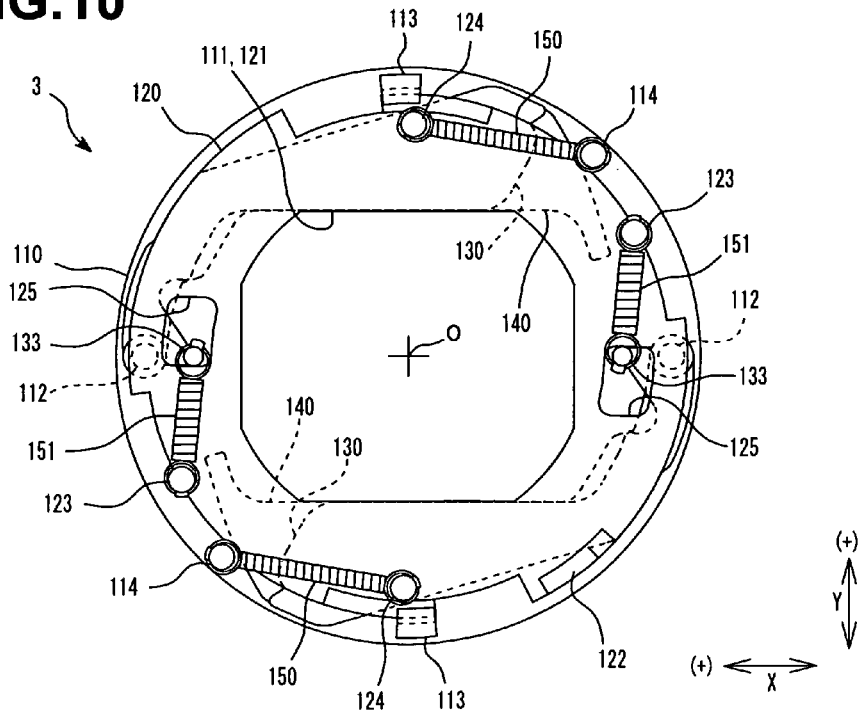
FIG. 10 is a back view of the barrier apparatus in an opened state.

In the present embodiment, the support shaft section 112 has a substantially cylindrical shape with a central axis parallel to the optical axis O. As shown in FIGS. 9 and 10, the pair of support shaft sections 112 are provided around the opening portion 111 so that a midpoint of a line segment connecting centers of the support shaft sections 112 substantially matches the optical axis O when viewed in the optical axis O direction. In other words, the pair of support shaft sections 112 are provided symmetrically with respect to the optical axis O as a point of symmetry when viewed in optical axis O direction.

A locking pawl 113 for preventing removal of a driving section 120 described later in the optical axis O direction is provided on the back side of the support section 110.

The pair of inner shielding members 130 and the pair of outer shielding members 140 as the shielding members are blade-shaped members each having a flat-shaped portion substantially parallel to the XY plane. As shown in FIGS. 9 and 10, the pair of inner shielding members 130 and the pair of outer shielding members 140 are such that, when viewed in the optical axis O direction, four flat-shaped portions of each of the shielding members are moved into and out of the opening portion 111 in the support section 110 to open/close the opening portion 111. The pair of inner shielding members 130 and the pair of outer shielding members 140 are made of synthetic resin.

The pair of inner shielding members 130 are moved into the substantial center of the opening portion 111 in a closed state of the barrier apparatus 3 shown in FIG. 9. Meanwhile, the pair of outer shielding members 140 are moved into the opening portion 111 so as to close a more outer side than the inner shielding members 130 in the closed state of the barrier apparatus 3.

The pair of inner shielding members 130 have the same shape, and are provided to face each other symmetrically with respect to the optical axis O as a point of symmetry when viewed in optical axis O direction. Similarly, the pair of outer shielding members 140 have the same shape, and are provided to face each other symmetrically with respect to the optical axis O as a point of symmetry when viewed in optical axis O direction.

Specifically, in a proximal end portion 131 of the inner shielding member 130, a bearing section 131a as a through hole in which the support shaft section 112 of the support section 110 slidably fits is provided. The inner shielding member 130 is supported rotatably around the support shaft section 112 with respect to the support section 110 by the support shaft section 112 fitting in the bearing section 131a of the proximal end portion 131.

Also in the proximal end portion 131 of the inner shielding member 130, an engaging section 133 is provided on a radially more inner side than the bearing section 131a (side closer to the optical axis O when viewed in the optical axis O direction) with the inner shielding member 130 being supported by the support section 110.

Figure 11:
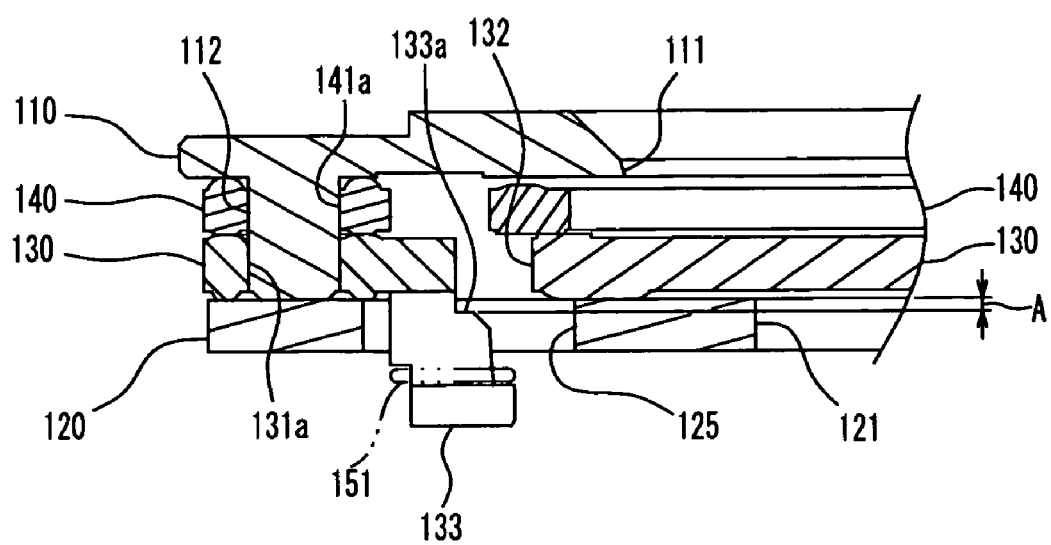
FIG. 11 is a sectional view taken along the line XI-XI in FIG. 9.

As shown in FIG. 11, the engaging section 133 is a protrusion protruding to a side opposite to the support section 110, and has a notch 133a so as not to interfere with a distal end 132 of the other facing inner shielding member 130. The notch 133a is provided so that a gap A of a predetermined value is obtained in the optical axis O direction between the engaging section 133 and the distal end 132 of the other facing inner shielding member 130.

Figure 12:
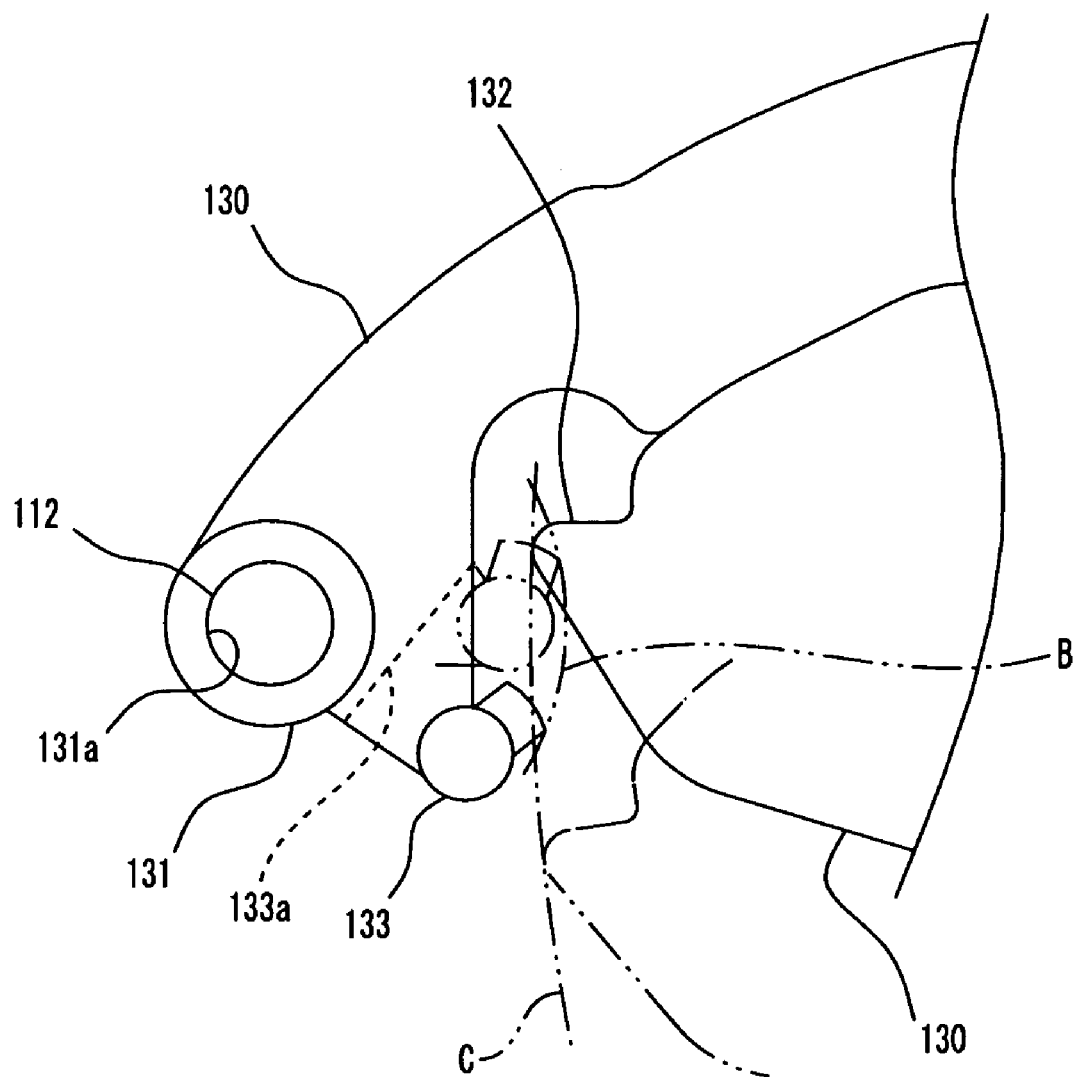
FIG. 12 illustrates a moving locus of an engaging section and a moving locus of a distal end of an inner shielding member.

In other words, as shown in FIG. 12, the engaging section 133 of the inner shielding member 130 is provided on the side closer to the optical axis O than the bearing section 131a so that a moving locus (arc B in FIG. 12) when viewed in the optical axis O direction overlaps a moving locus (arc C in FIG. 12) of the distal end 132 of the other facing inner shielding member 130. The engaging section 133 is spaced by the gap A apart from the distal end 132 of the other facing inner shielding member 130 in one optical axis O direction, and extends in one optical axis O direction in at least a region where the moving loci overlap.

Meanwhile, on the distal end 132 of the inner shielding member 130, a protrusion 132a protruding radially outward from a central axis of the bearing section 131a is provided.

In a proximal end portion 141 of the outer shielding member 140, a bearing section 141a as a through hole in which the support shaft section 112 of the support section 110 slidably fits is provided. The outer shielding member 140 is supported rotatably around the support shaft section 112 with respect to the support section 110 by the support shaft section 112 fitting in the bearing section 141a of the proximal end portion 141. The outer shielding member 140 is provided closer to the support section 110 than the above-described inner shielding member 130.

On a distal end of the outer shielding member 140, an engaging protrusion 142 is provided that protrudes to the side opposite to the support section 110 and engages the protrusion 132a on the inner shielding member 130 supported by the same support shaft section 112. When the inner shielding member 130 is moved from an opened state to a closed state, the outer shielding member 140 is moved to a shielding state according to the inner shielding member 130 by engagement between the engaging protrusion 142 and the protrusion 132a of the inner shielding member 130.

On a side opposite to the optical axis O of the flat-shaped portion of the outer shielding member 140, an engaging protrusion 143 is provided that protrudes to the side opposite to the support section 110 and engages the flat-shaped portion of the inner shielding member 130 supported by the same support shaft section 112. When the inner shielding member 130 is moved from the closed state to the opened state, the outer shielding member 140 is moved to an opened state according to the inner shielding member 130 by engagement between the engaging protrusion 143 and the flat-shaped portion of the inner shielding member 130.

The driving section 120 is a substantially disk-shaped member, and has an opening portion 121 substantially around the optical axis O at the center. The driving section 120 is supported rotatably with respect to the support section 110 substantially around the optical axis O on the back side of the support section 110 and on the back side of the inner shielding member 130.

Engaging holes 125 as through holes are provided in two positions corresponding to the engaging sections 133 protruding from the pair of inner shielding members 130 to the back side around the opening portion 121 in the driving section 120. The engaging hole 125 engages the engaging section 133 of the inner shielding member 130 inserted in the hole 125.

On the back side of the driving section 120, an urging member 151 is provided for urging the engaging section 133 of the inner shielding member 130 inserted into the engaging hole 125 with respect to the driving section 120 or the support section 110 in one circumferential direction of the optical axis O.

In the present embodiment, the urging member 151 is a tensile coil spring having an end locked to the engaging section 133 of the inner shielding member 130 and an end locked to a locking section 123 provided on the back side of the driving section 120, and urges the engaging section 133 and the locking section 123 close to each other.

As shown in FIGS. 9 and 10, the locking section 123 is spaced counterclockwise apart from the engaging hole 125 in which the engaging section 133 is inserted when the barrier apparatus 3 is viewed from the back side along the optical axis O. Thus, in the present embodiment, the engaging section 133 of the inner shielding member 130 is urged by the urging member 151 so as to be rotated clockwise around the support shaft section 112. In other words, the inner shielding member 130 is urged to be rotated to the shielding state by the urging member 151.

Specifically, as shown in FIG. 9, when the barrier apparatus 3 is viewed from the back side along the optical axis O, the driving section 120 is rotated counterclockwise with respect to the support section 110, and then the inner shielding member 130 is rotated to the shielding state. At this time, the outer shielding member 140 is rotated to the shielding state according to the inner shielding member 130.

On the other hand, as shown in FIG. 10, when the barrier apparatus 3 is viewed from the back side along the optical axis O, the driving section 120 is rotated clockwise with respect to the support section 110, and thus the inner shielding member 130 is rotated to the opened state by engagement between the engaging hole 125 in the driving section 120 and the engaging section 133 of the inner shielding member 130. At this time, the outer shielding member 140 is rotated to the opened state according to the inner shielding member 130.

On the back side of the driving section 120, an urging member 150 is provided for urging the driving section 120 with respect to the support section 110 in one circumferential direction of the optical axis O. In the present embodiment, the urging member 150 is a tensile coil spring having an end locked to a locking section 124 provided on the back side of the driving section 120 and an end locked to a locking section 114 provided on the back side of the support section 110, and urges the locking sections 124 and 114 close to each other.

In the present embodiment, the urging member 150 urges the driving section 120 so as to be rotated clockwise with respect to the support section 110 when the barrier apparatus 3 is viewed from the back side along the optical axis O as shown in FIG. 9.

On the back surface of the driving section 120, an inclined cam 122 is provided to protrude rearward. The inclined cam 122 is inserted through a through hole provided in the front surface of the first group frame 4 shown in FIG. 4, and abuts against the distal end 9d of the float key 9 in the retracted state of the lens barrel 1. The inclined cam 122 is urged toward the distal end 9d of the float key 9 by an urging force of the urging member 150.

Thus, in the retracted state of the lens barrel 1, the driving section 120 is rotated counterclockwise by engagement between the inclined cam 122 and the distal end 9d of the float key 9 when the barrier apparatus 3 is viewed from the back side along the optical axis O as shown in FIG. 9. Specifically, the barrier apparatus 3 enters the closed state where the inner shielding member 130 and the outer shielding member 140 are moved into the opening portion 111.

On the other hand, when the lens barrel 1 is advanced from the retracted state, a distance in the optical axis O direction between the inclined cam 122 of the driving section 120 and the distal end 9d of the float key 9 increases with increasing advancing amount. When the advancing amount of the lens barrel 1 reaches a predetermined value or more, the inclined cam 122 is moved apart from the float key 9. Thus, the driving section 120 is rotated clockwise according to the advancing amount of the lens barrel 1 when the barrier apparatus 3 is viewed from the back side along the optical axis O. When the advancing amount of the lens barrel 1 reaches the predetermined value or more, as shown in FIG. 10, the driving section 120 is rotated clockwise only by the urging force of the urging member 150 when the barrier apparatus 3 is viewed from the back side along the optical axis O. Specifically, the barrier apparatus 3 enters the opened state where the inner shielding member 130 and the outer shielding member 140 are retracted out of the opening portion 111.

According to the present embodiment, in the barrier apparatus 3 in which the pair of inner shielding members 130 are placed symmetrically with respect to the optical axis O, the engaging section 133 as a power point for rotationally driving the inner shielding member 130 is spaced by the gap A from the distal end 132 of the other facing inner shielding member 130 in one optical axis O direction. Thus, the distance between the pair of support shaft sections 112 can be reduced with the engaging section 133 being provided on the side closer to the optical axis O than the support shaft section 112.

Specifically, according to the present embodiment, the distance between the support shaft sections 112 that support the pair of inner shielding members 130 is reduced so that an inner diameter of the opening portion 111 is larger than an outer diameter of the barrier apparatus 3. In other words, the barrier apparatus 3 of the present embodiment can be reduced in outer diameter as compared with a conventional barrier apparatus having the same diameter of the opening portion 111. Also, the lens barrel 1 as the image pickup apparatus including the barrier apparatus 3 can be reduced in size.

The present invention is not limited to the above-described embodiment, but may be changed within the gist or the idea of the invention read from claims and the entire specification, and a barrier apparatus with such a change is included in the technical scope of the present invention.

The barrier apparatus according to the present invention may be applied to a lens barrel of an image pickup apparatus included in electronic equipment having a photographing function, for example, a recording device, a cell phone, a PDA, a personal computer, a game machine, a digital media player, a TV set, a GPS, a clock, or the like, not limited to the digital camera described in the embodiment.

The barrier apparatus according to the present invention may be applied to a lens barrel for a lens replaceable camera or a lens barrel included in a projection display apparatus such as a projector, not limited to the electronic equipment having a photographing function. The barrier apparatus according to the present invention may be applied to optical equipment of a different form such as a telescope or a binocular.

What is claimed is:

1. A barrier apparatus comprising:
   a support section having an opening portion through which an optical path of a photographing optical system passes;
   a pair of support shaft sections provided around the opening portion in the support section and in opposed positions with a center of the opening portion between the support shaft sections;
   a pair of shielding members having a proximal end portion supported rotatably around an axis along an optical axis of the optical path by the support shaft section, and a distal end movable into and out of the opening portion by the rotation;
   a pair of engaging sections provided on the pair of shielding members, respectively, each extending from the proximal end portion of the shielding member to a side closer to the center of the opening portion than the support shaft section, and spaced a predetermined distance apart from the distal end of the other shielding member in an optical axis direction of the optical path, the pair of engaging sections being provided such that a moving locus of the engaging section of one of the pair of shielding members when viewed in the optical axis direction overlaps a moving locus of the distal end of the other shielding member; and
   a driving section that engages the pair of engaging sections, is rotatable around the axis along the optical axis passing through the center of the opening portion with respect to the support section, and rotates the pair of shielding members by the rotation.

2. The barrier apparatus according to claim 1, wherein the pair of shielding members are made of synthetic resin.

3. An image pickup apparatus comprising the barrier apparatus according to claim 1, the photographing optical system being an image pickup apparatus including a focus lens group and a zoom lens group, comprising:
   a fixed frame;
   a focus lens holding frame holding the focus lens group;
   a zoom lens holding frame holding the zoom lens group;
   a focus driving unit provided on an outer peripheral portion of the fixed frame, and including a focus motor for focus driving of the focus lens group and a rotation transmitting mechanism of the focus motor;
   a zoom driving unit provided on the outer peripheral portion of the fixed frame and including a zoom motor for zoom driving of the zoom lens group and a rotation transmitting mechanism of the zoom motor; and
   an image pickup device that receives an optical image formed via the image pickup optical system.

4. The image pickup apparatus according to claim 3, further comprising:
   a base member that is coupled to the fixed frame, and supports the image pickup device displaceably in a first direction and a second direction perpendicular to the first direction in a plane parallel to a light receiving surface of the image pickup device;
   a first driving section provided on the base member, and including a first motor that drives the image pickup device in the first direction; and
   a second driving unit including a second motor that drives the image pickup device in the second direction.

5. The image pickup apparatus according to claim 4, wherein an exterior color of the fixed frame and the base member is different from an exterior color of the first motor and the second motor.

* * * * *